UNITED STATES PATENT OFFICE.

IRVING H. SWINK, OF DUBLIN, PENNSYLVANIA.

OIL-PAINT.

SPECIFICATION forming part of Letters Patent No. 569,306, dated October 13, 1896.

Application filed October 23, 1895. Serial No. 566,626. (No specimens.)

*To all whom it may concern:*

Be it known that I, IRVING H. SWINK, a citizen of the United States, residing at Dublin, in the county of Bucks and State of Pennsylvania, have invented certain new and useful Improvements in Oil-Paints, of which the following is a specification.

The invention relates to improvements in the composition of oil-paint and paint materials.

The object of the present invention is to provide the means for producing a very durable, adhesive, and absolutely insoluble oil-paint that can be manufactured very cheaply compared with any other oil-paints now on the market, the said paint also containing wearing and drying qualities not possessed by any other oil-paint.

The aforesaid oil-paint contains the following articles: cow's milk in any form desired, but preferably sweet, skimmed, or separator milk; the best burnt-stone lime, either air or water slacked, but preferably air-slacked; usual pigments, headlight or crude oil, rosin-oil, and linseed-oil.

The manner or process of compounding or manufacturing is as follows, to wit: I take a given quantity of sweet skimmed milk, say two quarts, and put into the same one and a half ounces of lime. Then I add three pounds Venetian red or any other suitable pigment. Then, if in a cold room or the temperature is too cold, I apply heat, (and frequently stir the mass so as to keep it thoroughly mixed,) which is only necessary when the atmosphere is cold; but in the summer season the atmosphere is warm enough of itself. This heat of the required temperature (namely, 80° to 90° Fahrenheit) being maintained and applied to the aforesaid mass or compound composed of milk, lime, and Venetian red or pigment causes said mass or compound to ferment, and it gets a head on it like yeast or beer and increases in volume, so that a vessel only half full before the fermentation commenced will become full and run over. I allow this fermentation to go on until I am convinced that the water formerly in the milk has been evaporated. Then I add one pint kerosene-oil, one quart rosin-oil, and one quart linseed-oil.

The above-described paint can easily be converted into a fine gloss-paint by grinding and the addition of a little varnish, thus taking the place of the most expensive gloss-paints now on the market. For the ordinary purposes of house-painting, &c., the above-described paint has gloss enough to equal the best oil-paint now made without adding anything thereto. It contains no deleterious substances, such as spirits of turpentine, benzene, &c., which always destroys the wearing qualities of any paint used in the weather.

Changes in the proportion and the minor details of compounding or the manufacturing of said oil-paint may be resorted to without departing from the principles or sacrificing any of the advantages of this invention.

Having thus fully described my invention, what I claim as new and useful is—

The hereinbefore-described process of making an oil-paint consisting of combining sweet skimmed milk a suitable pigment kerosene-oil rosin-oil and linseed-oil by first mixing the milk lime and pigment and fermenting the mass and then adding the aforesaid kerosene rosin and linseed oils in the proportions substantially as described.

In testimony whereof I have hereunto affixed my signature in the presence of two subscribing witnesses.

IRVING H. SWINK.

Witnesses:
 NOAH K. STEAR,
 PEARSON R. KROUT.